US011772563B2

(12) United States Patent
Nakamura

(10) Patent No.: US 11,772,563 B2
(45) Date of Patent: Oct. 3, 2023

(54) IN-VEHICLE MULTI-MONITORING DEVICE FOR VEHICLE

(71) Applicant: SUBARU CORPORATION, Tokyo (JP)

(72) Inventor: Ryota Nakamura, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 17/673,112

(22) Filed: Feb. 16, 2022

(65) Prior Publication Data

US 2022/0266753 A1      Aug. 25, 2022

(30) Foreign Application Priority Data

Feb. 24, 2021  (JP) ................................ 2021-027737

(51) Int. Cl.
| | |
|---|---|
| *B60R 1/29* | (2022.01) |
| *B60R 11/04* | (2006.01) |
| *H04N 13/167* | (2018.01) |
| *H04N 13/246* | (2018.01) |
| *G06V 20/59* | (2022.01) |

(Continued)

(52) U.S. Cl.
CPC ............... *B60R 1/29* (2022.01); *B60R 11/04* (2013.01); *G06V 20/593* (2022.01); *G06V 20/597* (2022.01); *G06V 40/10* (2022.01); *H04N 13/167* (2018.05); *H04N 13/246* (2018.05); *B60R 2011/0003* (2013.01); *B60R 2300/105* (2013.01); *B60R 2300/30* (2013.01); *B60R 2300/8006* (2013.01)

(58) Field of Classification Search
None
See application file for complete search history.

(56) References Cited

U.S. PATENT DOCUMENTS

| | | | | |
|---|---|---|---|---|
| 2008/0068186 | A1* | 3/2008 | Bonefas | G08B 21/06 340/575 |
| 2015/0379362 | A1* | 12/2015 | Calmes | G06T 7/20 348/136 |
| 2020/0094762 | A1 | 3/2020 | Nakamura | |

(Continued)

FOREIGN PATENT DOCUMENTS

| | | |
|---|---|---|
| JP | 2018-088647 A | 6/2018 |
| JP | 2020-050078 A | 4/2020 |

*Primary Examiner* — Rebecca A Volentine
(74) *Attorney, Agent, or Firm* — McDermott Will & Emery LLP

(57) ABSTRACT

An in-vehicle multi-monitoring device for a vehicle includes first and second imaging members, and a controller. The first imaging member performs first imaging to capture a first image of one or more occupants in a passenger compartment of the vehicle. The second imaging member perform second imaging to capture a second image of the one or more occupants. The controller executes a process on the first image and the second image. The first imaging member and the second imaging member are configured to perform the first imaging and the second imaging respectively at different angles of view or in different imaging ranges. The process includes multiple types of processes for the one or more occupants in the passenger compartment. The multiple types of processes are executed based on the first image and the second image captured at the different angles of view or in the different imaging ranges.

20 Claims, 8 Drawing Sheets

(51) Int. Cl.
G06V 40/10 (2022.01)
B60R 11/00 (2006.01)

(56) References Cited

U.S. PATENT DOCUMENTS

2020/0322527 A1* 10/2020 Orikasa .................... H04N 7/18
2022/0292705 A1* 9/2022 Friedman ............... G06V 10/82

* cited by examiner

FIG. 3

| MONITORING FUNCTION | DRIVER | FELLOW PASSENGER |
|---|---|---|
| INATTENTIVENESS | HIGHLY RECOMMENDED | OPTIONAL |
| DROWSINESS | HIGHLY RECOMMENDED | OPTIONAL |
| SEATED POSTURE | RECOMMENDED | RECOMMENDED |
| EMERGENCY | HIGHLY RECOMMENDED | RECOMMENDED |
| WEARING OF SEAT BELT | RECOMMENDED | RECOMMENDED |
| PRESENCE OF CHILD RESTRAINT SEAT | NOT NECESSARY | RECOMMENDED |
| ⋮ | | |

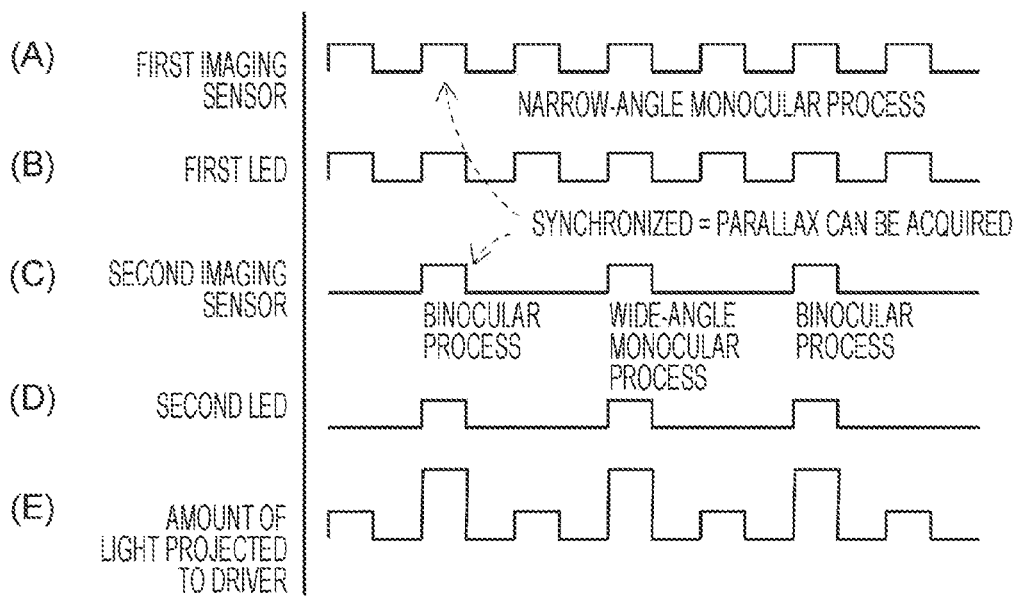
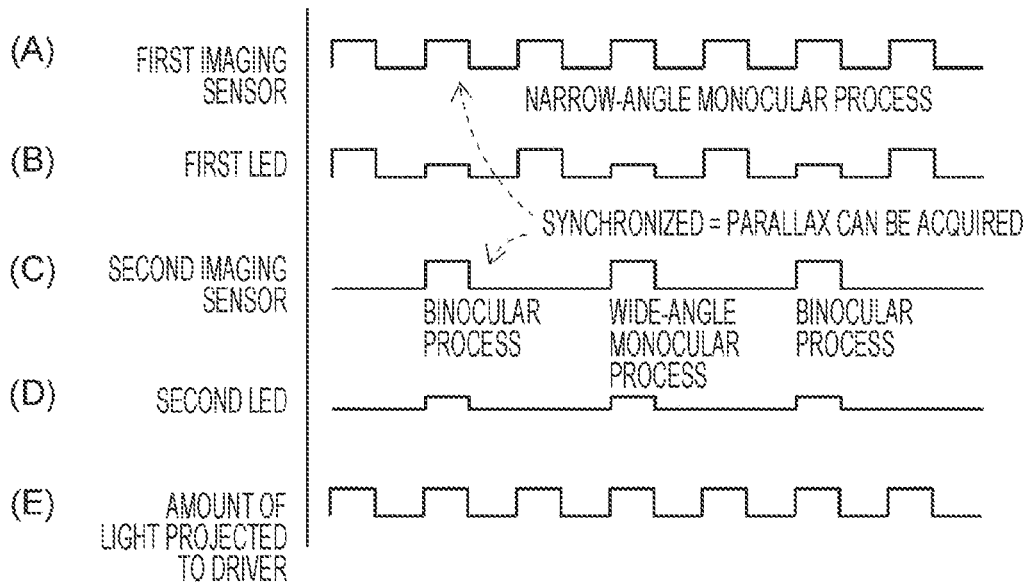

IN-VEHICLE MULTI-MONITORING DEVICE FOR VEHICLE

CROSS-REFERENCE TO RELATED APPLICATIONS

The present application claims priority from Japanese Patent Application No. 2021-027737 filed on Feb. 24, 2021, the entire contents of which are hereby incorporated by reference.

BACKGROUND

The disclosure relates to an in-vehicle multi-monitoring device for a vehicle.

A vehicle is provided with an occupant monitoring device for monitoring a driver of the vehicle.

Japanese Unexamined Patent Application Publication No. 2018-088647 discloses an occupant monitoring device for a vehicle that captures an image focusing on the eyes of a driver to monitor the driver.

Japanese Unexamined Patent Application Publication No. 2020-050078 discloses an occupant monitoring device for a vehicle that radiates intense light onto the head of an occupant when capturing an image of the head of the occupant during a collision.

SUMMARY

An aspect of the disclosure provides an in-vehicle multi-monitoring device for a vehicle, the in-vehicle multi-monitoring device includes a first imaging member, a second imaging member, and a controller. The first imaging member is configured to perform first imaging to capture a first image of one or more occupants in a passenger compartment of the vehicle. The second imaging member perform second imaging to capture a second image of the one or more occupants in the passenger compartment of the vehicle. The controller is configured to execute a process on the first image and the second image. The first imaging member and the second imaging member are configured to perform the first imaging and the second imaging respectively at different angles of view or in different imaging ranges. The process includes a plurality of types of processes for the one or more occupants in the passenger compartment. The plurality of types of processes are to be executed based on the first image and the second image captured at the different angles of view or in the different imaging ranges.

An aspect of the disclosure provides an in-vehicle multi-monitoring device for a vehicle, the in-vehicle multi-monitoring device includes a first camera module, a second camera module, and circuitry. The first camera module is configured to perform first imaging to capture a first image of one or more occupants in a passenger compartment of the vehicle. The second camera module perform second imaging to capture a second image of the one or more occupants in the passenger compartment of the vehicle. The circuitry is configured to execute a process on the first image and the second image. The first camera module and the second camera module are configured to perform the first imaging and the second imaging respectively at different angles of view or in different imaging ranges. The process includes a plurality of types of processes for the one or more occupants in the passenger compartment. The plurality of types of processes are to be executed based on the first image and the second image captured at the different angles of view or in the different imaging ranges.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

FIG. 3 is a diagram illustrating example monitoring types for an occupant monitoring device of the automobile illustrated in FIG. 2;

FIG. 7 is a timing chart of a basic image capturing and light emission operation of the first camera module and the second camera module illustrated in FIG. 4;

FIG. 8 is a timing chart of an image capturing and light emission operation of the first camera module and the second camera module illustrated in FIG. 4 according to the embodiment;

DETAILED DESCRIPTION

In monitoring occupants in a vehicle, it is demanded to increase the number of monitoring types to increase the monitoring capability. For example, in automatic driving or advanced driving assistance, the state of an occupant such as a driver is more reliably monitored to determine whether the occupant is maintained in a state suitable for driving or moving.

However, the occupant monitoring devices for a vehicle described above are basically configured to capture an image using a single imaging member and execute a specific monitoring process suitable for the captured image. In this configuration, to increase the number of monitoring types for occupants, the number of imaging members for monitoring the occupants is increased in proportion to the increase in the number of monitoring types. If it is difficult to provide an occupant monitoring device for a vehicle with additional imaging members due to the limited space for installation in the vehicle, the occupant monitoring device is hindered from being multifunctional. As a result, a certain level or higher of multifunctionality may be difficult to achieve.

It is desirable to increase the number of monitoring types for occupants including a driver in a vehicle to achieve multifunctionality of an occupant monitoring device for the vehicle, in which an increase in the number of imaging members to be used for monitoring is less likely to be restricted.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
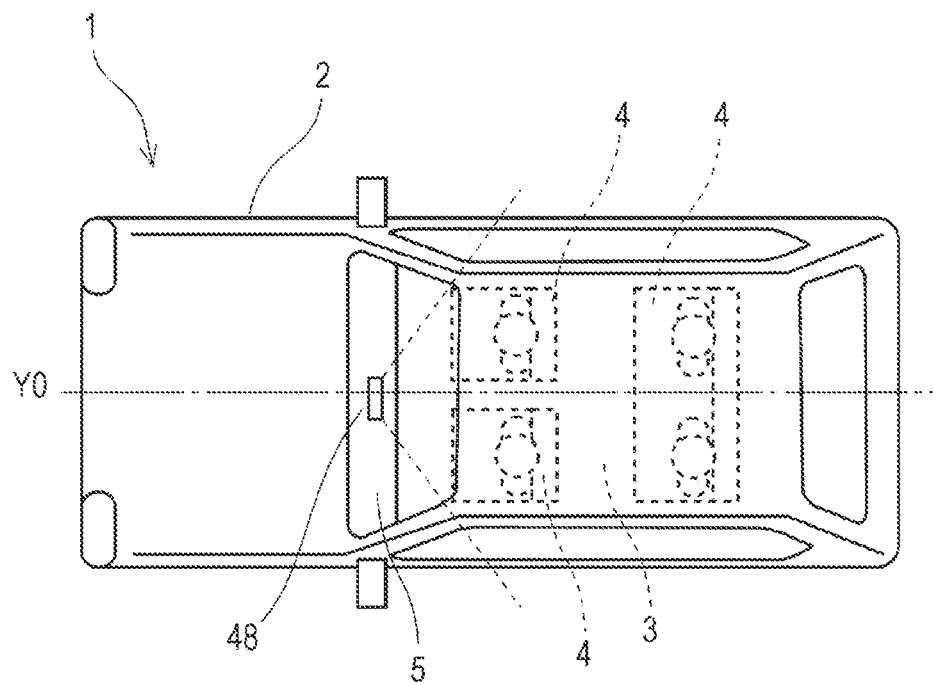
FIG. 1 is a diagram illustrating an automobile according to an embodiment of the disclosure.

FIG. 1 is a diagram illustrating an automobile 1 according to the embodiment of the disclosure.

The automobile 1 is an example of a vehicle. The automobile 1 may be configured such that an internal combustion engine is used as a power source for traveling, electric power stored in a battery is used as a power source for traveling, or a combination of them is used.

Further, the automobile 1 may be configured to travel according to a driving operation of a driver, travel by automatic driving or driving assistance, or travel by switching between them.

Examples of such a vehicle include the automobile 1, a personal mobility vehicle, a powered two-wheeled vehicle, a powered three-wheeled vehicle, a bus, a truck, an aircraft, and a railroad vehicle.

The automobile 1 illustrated in FIG. 1 has a body 2 including a passenger compartment 3 capable of carrying a plurality of occupants including the driver. The passenger compartment 3 is provided with a plurality of front seats 4 on which a plurality of occupants such as the driver can sit independently, and a long rear seat 4 on which a plurality of occupants can sit side-by-side. During traveling, the occupants such as the driver are demanded to be correctly seated on the seats 4 and to wear a safety device such as a seat belt.

The passenger compartment 3 has a dashboard 5 on a front portion thereof ahead of the plurality of front seats 4. The dashboard 5 extends in a vehicle width direction of the body 2.

Figure 2:
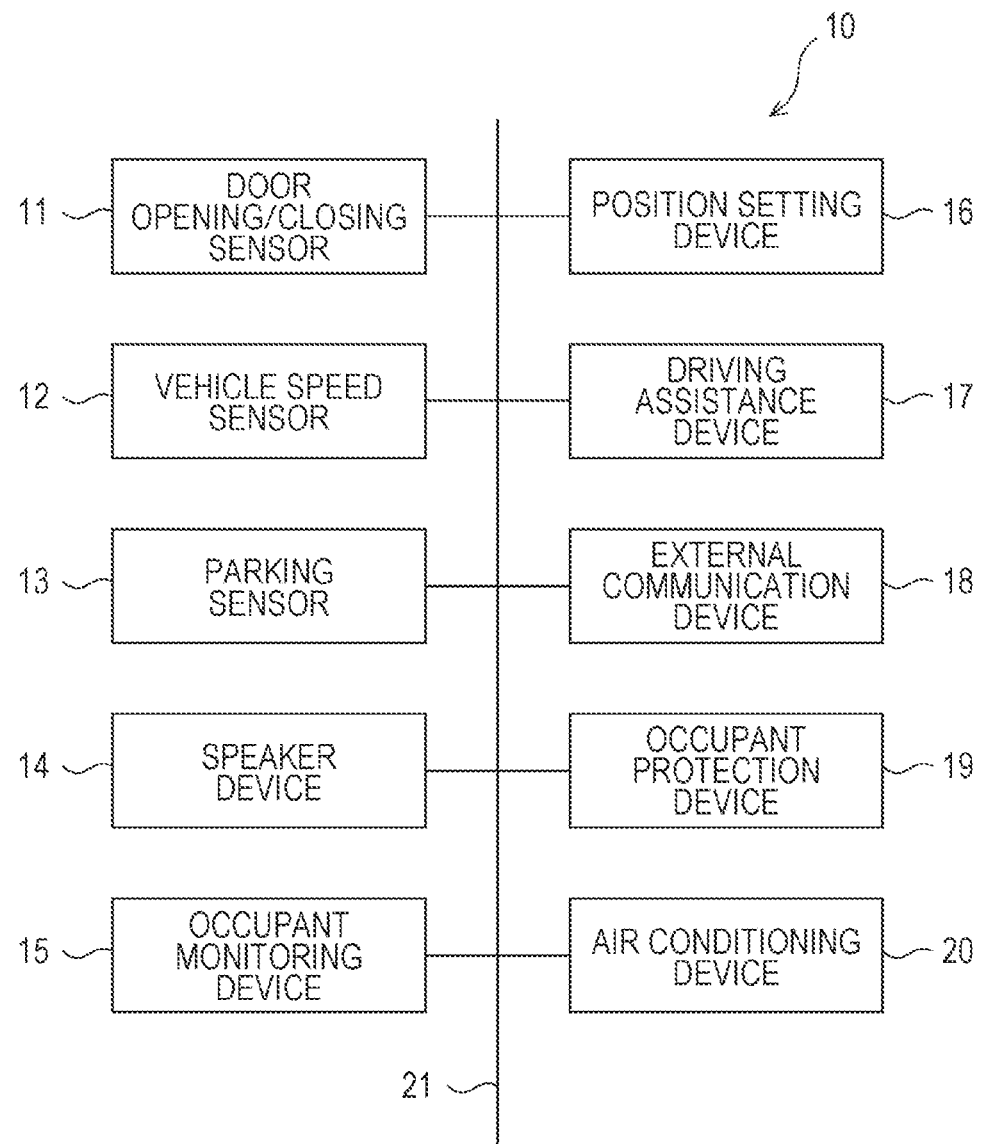
FIG. 2 is a diagram illustrating a control device of the automobile illustrated in FIG. 1.

FIG. 2 is a diagram illustrating a control device 10 of the automobile 1 illustrated in FIG. 1.

The control device 10 illustrated in FIG. 2 includes a door opening/closing sensor 11, a vehicle speed sensor 12, a parking sensor 13, a speaker device 14, an occupant monitoring device 15, a position setting device 16, a driving assistance device 17, an external communication device 18, an occupant protection device 19, an air conditioning device 20, and an in-vehicle network 21 to which the components described above are coupled. The in-vehicle network 21 may be a wired communication network based on, for example, Controller Area Network (CAN) or Local Interconnect Network (LIN) for the automobile 1. The in-vehicle network 21 may be a communication network such as a local area network (LAN) or a combination of them. A portion of the in-vehicle network 21 may include a wireless communication network.

The door opening/closing sensor 11 detects opening and closing of a door of the automobile 1.

The vehicle speed sensor 12 detects the speed of the automobile 1 that is traveling. The vehicle speed sensor 12 may detect the stop state of the automobile 1.

The parking sensor 13 detects a parking state in which the automobile 1 is held in the stop position. The parking sensor 13 may detect the parking state in response to, for example, a shift lever (not illustrated) being shifted to the parking position or a parking lever (not illustrated) being shifted to the brake position.

For example, when the door opening/closing sensor 11 detects opening or closing of a door, the occupant monitoring device 15 executes a process of recognizing an occupant in the passenger compartment 3 and then monitors the state of the occupant. When a plurality of occupants are recognized, the occupant monitoring device 15 may individually monitor the plurality of occupants.

The occupant monitoring device 15 may output information on each recognized occupant and information based on monitoring to the components of the control device 10 via the in-vehicle network 21.

When an occupant such as the driver is in a predetermined state, the occupant monitoring device 15 may execute control such as outputting a warning for calling attention to the occupant or execute control for preventing or reducing damage. At this time, the occupant monitoring device 15 may output control information or the like to the components of the control device 10 via the in-vehicle network 21.

The speaker device 14 outputs voice, a warning sound, or the like. The speaker device 14 may output a warning to the driver or any other occupant under the occupant monitoring device 15.

The position setting device 16 adjusts, for example, the horizontal and vertical positions of the seats 4, the backrest angle of the seats 4, the horizontal and vertical positions of a steering wheel 7 (see FIG. 4 and the like described below), the angle of the steering wheel 7, the horizontal and vertical positions of various pedals, and the angle of the various pedals. The position setting device 16 changes a seat position on the basis of the occupant information output from the occupant monitoring device 15.

The driving assistance device 17 performs control to assist the driver in driving the automobile 1 during manual driving or controls the traveling of the automobile 1 during automatic driving. The driving assistance device 17 controls acceleration, deceleration, stop, and steering of the automobile 1. The driving assistance device 17 may execute driving assistance for the driver on the basis of driver information output from the occupant monitoring device 15.

The external communication device 18 establishes, for example, a wireless communication path with a base station of a public wireless communication network, a base station of a commercial wireless communication network, or a base station for advanced traffic information and executes data communication using the established wireless communication path. The external communication device 18 may execute two-way data communication with, for example, a server device or the like that assists automatic driving. The external communication device 18 may transmit information on the occupants including the driver, which is output from the occupant monitoring device 15, to the server device as, for example, emergency assistance information.

In response to detection or prediction of a collision of the automobile 1, the occupant protection device 19 executes control to protect the occupants. The occupant protection device 19 protects the occupants seated on the seats 4 by, for example, deploying air bags (not illustrated) or applying tension to the seat belts. The occupant protection device 19 may protect the occupants in accordance with the occupant information output from the occupant monitoring device 15.

The air conditioning device 20 controls the temperature and oxygen concentration of the passenger compartment 3. For example, the air conditioning device 20 supplies cooled air or heated air to the passenger compartment 3 to adjust the temperature of the passenger compartment 3 to a set temperature. The air conditioning device 20 may execute air conditioning in accordance with the occupant information output from the occupant monitoring device 15.

The control based on the occupant information output from the occupant monitoring device 15 described above allows the occupants to stay comfortable under their appropriate settings, for example. The driver is able to concentrate on, for example, the driving of the automobile 1.

FIG. 3 is a diagram illustrating example monitoring types for the occupant monitoring device 15 of the automobile 1 illustrated in FIG. 2.

FIG. 3 illustrates monitoring types, for example, inattentiveness, drowsiness, seated posture, emergency, wearing of a seat belt, and presence of a child restraint seat.

The occupant monitoring device 15 may control one of the monitoring types described above. In some embodiments, the occupant monitoring device 15 may serve as an in-vehicle multi-monitoring device to control a plurality of monitoring types among the monitoring types described above or all of the monitoring types.

Among the monitoring types described above, for example, inattentiveness, drowsiness, and emergency may be events for which the driver is to be monitored.

The seated posture, emergency, and wearing of a seat belt may be events for which not only the driver but also occupants other than the driver are desired to be monitored.

Presence of a child restraint seat may be set to low monitoring priority since the automobile 1 may have a function of detecting the presence of a child restraint seat or setting a child restraint seat.

The plurality of types of monitoring described above are performed to increase the monitoring capability of the occupant monitoring device 15 of the automobile 1. In automatic driving or advanced driving assistance, it is desirable that occupants such as the driver be maintained in a state suitable for traveling of the automobile 1 and that each of the plurality of types of monitoring be executed more accurately.

However, when the plurality of types of monitoring described above are to be implemented in the automobile 1, the occupant monitoring device 15 may include an imaging sensor for each monitoring type and each occupant. On the other hand, a space for installing imaging sensors in the passenger compartment 3 is limited. If it is difficult to provide the occupant monitoring device 15 of the automobile 1 with additional imaging sensors due to the limited space for installation in the automobile 1, the occupant monitoring device 15 is hindered from being multifunctional. As a result, it may be difficult for the occupant monitoring device 15 to achieve a certain level or higher of multifunctionality.

As described above, in the automobile 1, to achieve multifunctionality in terms of monitoring types for a plurality of occupants including the driver, it is probable to restrict an increase in the number of imaging sensors to be used for monitoring. As the number of images captured by the imaging sensors increases, the processing load also increases.

This embodiment discloses an example for appropriately avoiding such a restriction related to the occupant monitoring device 15 of the automobile 1 to increase the feasibility of a plurality of types of monitoring as described above.

In one example, the occupant monitoring device 15 according to this embodiment controls a plurality of monitoring types, such as inattentiveness of the driver, drowsiness of the driver, the seated position or posture of each occupant, emergency of each occupant, wearing of a seat belt by each occupant, presence of a child restraint seat, and image output, on the basis of images captured by two imaging sensors.

Figure 4:
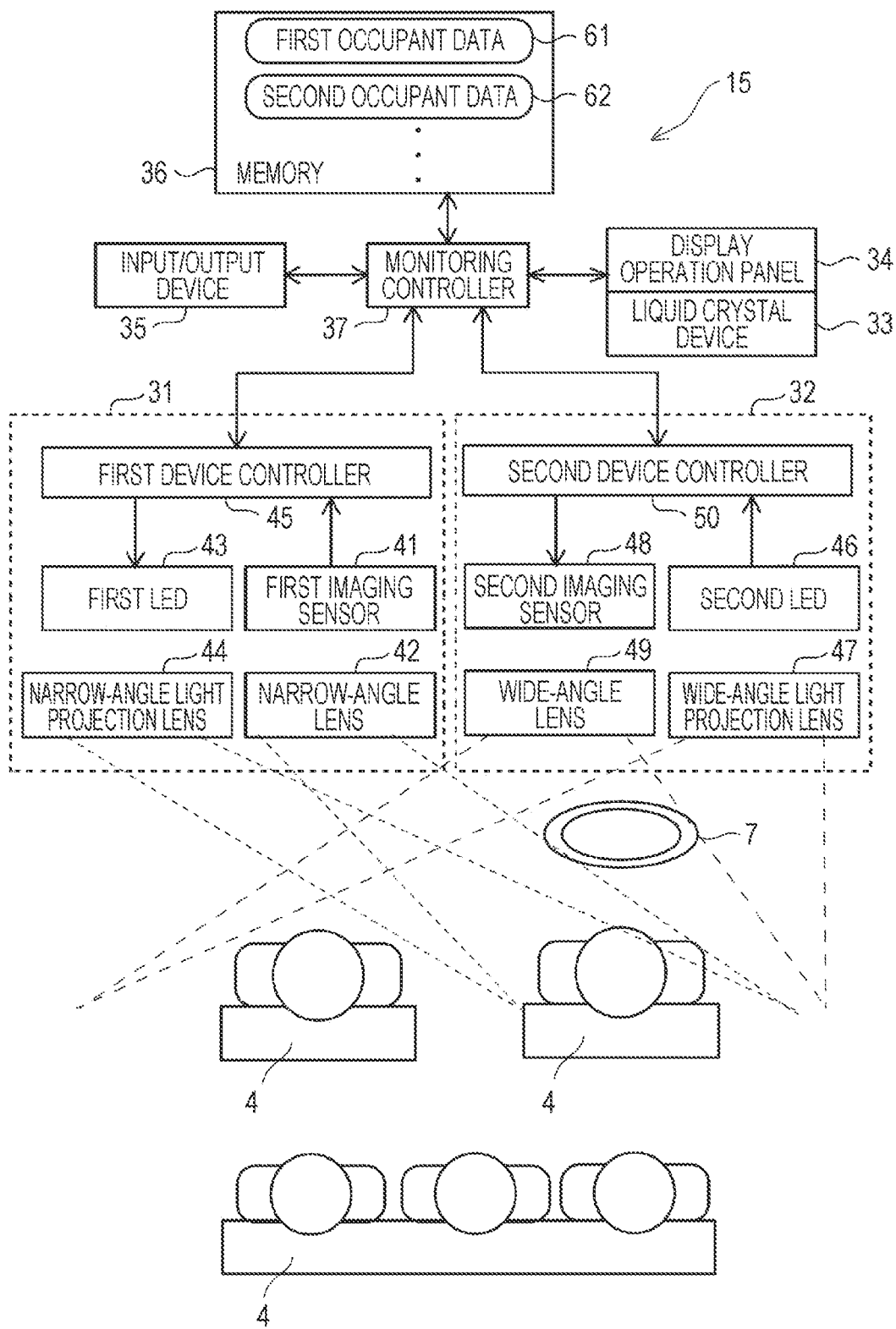
FIG. 4 is a diagram illustrating the occupant monitoring device illustrated in FIG. 3.

FIG. 4 is a diagram illustrating the occupant monitoring device 15 illustrated in FIG. 3 serving as an in-vehicle multi-monitoring device for the automobile 1 according to an embodiment of the disclosure.

The occupant monitoring device 15 illustrated in FIG. 4 is configured to monitor the driver and a plurality of other occupants seated on the plurality of seats 4.

The occupant monitoring device 15 illustrated in FIG. 4 includes a first camera module 31, a second camera module 32, a liquid crystal device 33 having a display operation panel 34, an input/output device 35, a memory 36, and a monitoring controller 37 coupled to the components described above.

The input/output device 35 is coupled to the in-vehicle network 21. The input/output device 35 inputs and outputs data to and from the other components of the automobile 1 via the in-vehicle network 21.

The liquid crystal device 33 displays, on the display operation panel 34, a screen to be visually recognized by each occupant in the automobile 1. Examples of the displayed screen include an operation screen to be operated by the occupant.

The display operation panel 34 is a transparent or translucent panel that overlies a display surface of the liquid crystal device 33. The display operation panel 34 detects an operation of an occupant on the display surface of the liquid crystal device 33 and outputs information such as an operation position to the monitoring controller 37.

The first camera module 31 includes a first light-emitting diode (LED) 43, a first imaging sensor 41, and a first device controller 45 coupled to the components described above.

The first imaging sensor 41 may be, for example, a semiconductor optical sensor such as a charge-coupled device (CCD) sensor or a complementary metal oxide semiconductor (CMOS) sensor. The first imaging sensor 41 outputs imaging data including a captured image to the monitoring controller 37.

The first imaging sensor 41 is overlaid with a narrow-angle lens 42. The narrow-angle lens 42 may include a plurality of optical lenses to reduce distortion in the peripheral part of an image.

The first LED 43 may be a semiconductor light-emitting element. The first LED 43 is overlaid with a narrow-angle light projection lens 44. The first LED 43 may project infrared light, for example. In this case, the first imaging sensor 41 outputs imaging data including an image captured with infrared light to the monitoring controller 37.

The first device controller 45 controls the operation of the first imaging sensor 41 and the operation of the first LED 43. The first device controller 45 causes the first LED 43 to emit light in a period of time during which the first imaging sensor 41 captures an image. The control cycle of the first device controller 45 can be set by the monitoring controller 37.

The second camera module 32 includes a second LED 46, a second imaging sensor 48, and a second device controller 50 coupled to the components described above.

The second imaging sensor 48 may be, for example, a semiconductor optical sensor such as a CCD sensor or a CMOS sensor. The second imaging sensor 48 outputs imaging data including a captured image to the monitoring controller 37.

The second imaging sensor 48 is overlaid with a wide-angle lens 49. The wide-angle lens 49 may include a plurality of optical lenses to reduce distortion in the peripheral part of an image.

The second LED 46 may be a semiconductor light-emitting element. The second LED 46 is overlaid with a wide-angle light projection lens 47. The second LED 46 may project infrared light, for example. In this case, the second imaging sensor 48 outputs imaging data including an image captured with infrared light to the monitoring controller 37.

The second device controller 50 controls the operation of the second imaging sensor 48 and the operation of the second LED 46. The second device controller 50 causes the second LED 46 to emit light in a period of time during which the second imaging sensor 48 captures an image. The control cycle of the second device controller 50 can be set by the monitoring controller 37.

As illustrated in FIG. 4, the first LED 43 of the first camera module 31 projects light to the upper body or the head of the driver at a narrow angle, and the first imaging sensor 41 captures an image of the upper body or the head of the driver at a narrow angle. Thus, the first imaging sensor 41 can capture a high-resolution bright image of the upper body or the head of the driver. The image captured by the first imaging sensor 41 can be a high-resolution image of the eyes, eyeballs, and the like of the driver.

In contrast, the second LED 46 of the second camera module 32 projects light to the entirety of the inside of the passenger compartment 3 at a wide angle, and the second imaging sensor 48 captures an image of the entirety of the inside of the passenger compartment 3 at a wide angle. Thus, the second imaging sensor can capture a bright image including the driver and the plurality of other occupants. The image captured by the second imaging sensor 48 can be an image of the driver and the fellow passengers other than the driver, namely, the fellow passenger in the front passenger seat 4 and the fellow passengers in the rear seat 4.

The first imaging sensor 41 and the second imaging sensor 48, which are configured to capture images of the occupants in the passenger compartment 3 of the automobile 1, are disposed in a center portion of the automobile 1 in the vehicle width direction so as to be arranged side-by-side in the vehicle width direction, and capture images of the passenger compartment 3 at different angles of view or in different imaging ranges.

Further, the first imaging sensor 41 and the second imaging sensor 48 are disposed such that portions of the imaging ranges of the first imaging sensor 41 and the second imaging sensor 48 overlap each other to capture images of the driver in common.

The memory 36 stores a program and data. The memory 36 may include a non-volatile memory and a volatile memory. Examples of the non-volatile memory include a hard disk drive (HDD), a solid state drive (SSD), and an electrically erasable programmable read-only memory (EEPROM). Examples of the volatile memory include a random-access memory (RAM).

The memory 36 of the occupant monitoring device 15 may store data of the plurality of occupants in the automobile 1 such that the data of the plurality of occupants can be managed on an occupant-by-occupant basis. FIG. 4 illustrates first occupant data 61 indicating a first occupant and second occupant data 62 indicating a second occupant. The memory 36 has a database storing a plurality of pieces of occupant data.

The pieces of occupant data, such as the first occupant data 61 and the second occupant data 62, may each include identification information unique to the corresponding occupant, for example, registered imaging data of an image of the head or eyes of the occupant captured with the first imaging sensor 41 or the second imaging sensor 48, and various kinds of settings data set by the occupant. The settings data may include information such as the position of the occupant seated on the seat, initial setting of whether driving assistance is enabled, traveling preference information for automatic driving, information on a server device to be used, occupant protection setting, and air conditioning setting.

As described above, the memory 36 can store, as registered imaging data of each occupant, imaging data of an image of the occupant captured with the first imaging sensor 41 or the second imaging sensor 48 from the front while a predetermined screen is displayed on the liquid crystal device 33.

The memory 36 may also store occupant data of general unregistered occupants.

The monitoring controller 37 may be, for example, an electronic control unit (ECU), a central processing unit (CPU), or any other microcomputer. The monitoring controller 37 reads a program from the memory 36 and executes the program. Accordingly, the monitoring controller 37 is implemented. In one embodiment, the monitoring controller 37 may serve as a "controller".

The monitoring controller 37 is capable of executing processing on an image captured by the first imaging sensor 41 and an image captured by the second imaging sensor 48.

The monitoring controller 37 may execute a plurality of types of processes as described above for the occupants in the passenger compartment 3, based on the image captured by the first imaging sensor 41 and the image captured by the second imaging sensor 48 having different angles of view or different imaging ranges.

For example, the monitoring controller 37 may execute control for identifying or registering the occupants in the automobile 1. The monitoring controller 37 may execute control in accordance with, for example, the content of an operation determined as an operation of an occupant on the operation screen of the liquid crystal device 33.

Upon an occupant riding in the automobile 1, the monitoring controller 37 identifies the occupant and executes control to monitor the state of the occupant.

In one example, the monitoring controller 37 may determine events of an occupant as the driver, such as inattentiveness, drowsiness, and emergency, on the basis of the state of the eyes of the occupant by using the registered imaging data of the occupant registered in the memory 36 as reference data.

Figure 5:
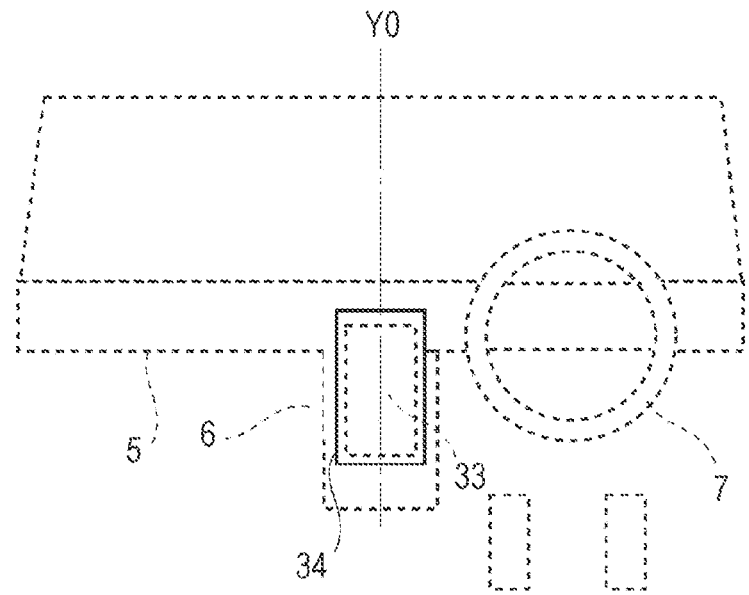
FIG. 5 is a diagram illustrating how a liquid crystal device having a display operation panel illustrated in FIG. 4 is disposed.

FIG. 5 is a diagram illustrating how the liquid crystal device 33 having the display operation panel 34 illustrated in FIG. 4 is disposed.

FIG. 5 illustrates the dashboard 5 and a center console 6. The dashboard 5 and the center console 6 are disposed in the front portion of the passenger compartment 3.

The liquid crystal device 33 having the display operation panel 34 illustrated in FIG. 4 is disposed in a center portion of the automobile 1 in the vehicle width direction in such a manner as to face the rear of the automobile 1. The liquid crystal device 33 having the display operation panel 34 is disposed to be vertically embedded in a portion of the dashboard 5 up to the center console 6.

Figure 6:
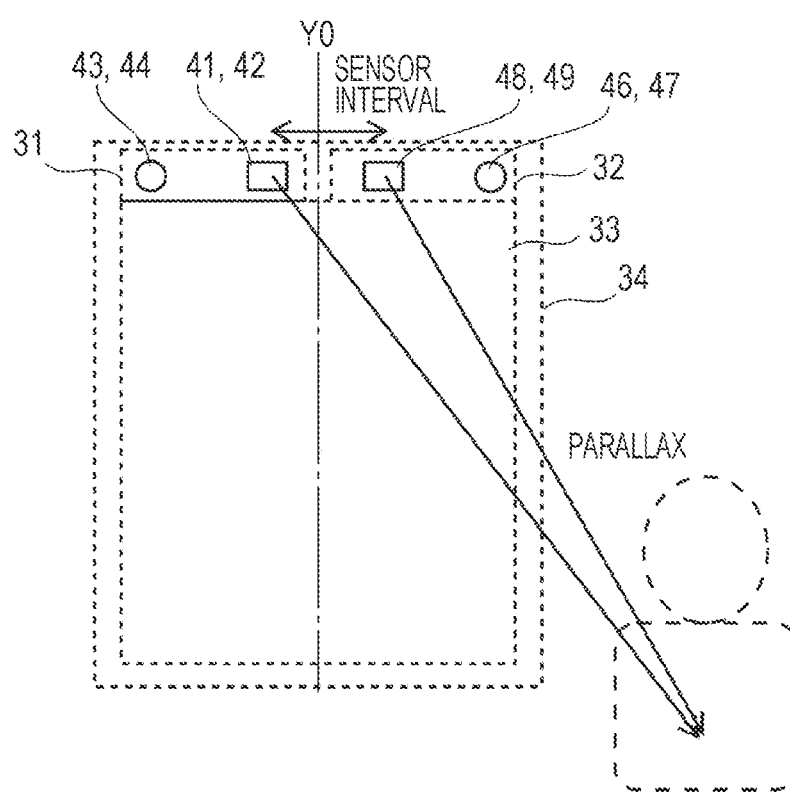
FIG. 6 is a diagram illustrating how a first camera module and a second camera module illustrated in FIG. 4 are disposed.

FIG. 6 is a diagram illustrating how the first camera module 31 and the second camera module 32 illustrated in FIG. 4 are disposed.

As illustrated in FIG. 6, the first camera module 31 and the second camera module 32 illustrated in FIG. 4 are disposed on the back side of the display operation panel 34 of the liquid crystal device 33 so as to be disposed in an upper position relative to the liquid crystal device 33.

The first LED 43 and the first imaging sensor 41 of the first camera module 31 and the second imaging sensor 48 and the second LED 46 of the second camera module 32 are arranged side-by-side in the vehicle width direction of the automobile 1.

The first imaging sensor 41 is disposed on the side of the automobile 1 away from the driver in the vehicle width direction with respect to a center position Y0. The second imaging sensor 48 is disposed on the side of the automobile 1 adjacent to the driver in the vehicle width direction with respect to the center position Y0. Accordingly, the first imaging sensor 41 configured to capture an image of the upper body or the head of the driver at a narrow angle is disposed farther away from the driver in the vehicle width direction of the automobile 1 than the second imaging sensor 48 configured to capture an image of the entirety of the inside of the passenger compartment 3 at a wide angle. The steering wheel 7 illustrated in FIG. 5 is less likely to be present between the first imaging sensor 41 and the driver. The steering wheel 7 is less likely to appear in an image captured by the first imaging sensor 41.

Since the first imaging sensor 41 and the second imaging sensor 48 are arranged side-by-side in the vehicle width direction of the automobile 1, parallax occurs with respect to the driver illustrated in FIG. 6. For example, even if the first imaging sensor 41 and the second imaging sensor 48 are configured to capture images at the same angle of view or in the same imaging range, the position of the driver in the image captured by the first imaging sensor 41 and the position of the driver in the image captured by the second imaging sensor 48 are shifted from each other in accordance with the parallax. The parallax is generated in accordance with the interval between the first imaging sensor 41 and the second imaging sensor 48.

The first LED 43 is disposed farther away from the driver than the first imaging sensor 41 in the vehicle width direction of the automobile 1. Light output from the first LED 43 toward the driver is less likely to be blocked by the steering wheel 7.

The second LED 46 is disposed closer to the driver than the second imaging sensor 48 in the vehicle width direction of the automobile 1. The second LED 46 is disposed farther from the center position Y0 of the automobile 1 in the vehicle width direction than the second imaging sensor 48 in the vehicle width direction of the automobile 1. Accordingly, the second imaging sensor 48 can be disposed close to the center position Y0 in the center portion of the automobile 1 in the vehicle width direction. The second imaging sensor 48 disposed close to the center position Y0 is capable of capturing an image of the entirety of the inside of the passenger compartment 3 at a wide angle from the center portion of the automobile 1 in the vehicle width direction. The second imaging sensor 48 is capable of capturing an image of not only the occupants seated on the plurality of front seats 4 but also the plurality of occupants seated on the rear seat 4.

FIG. 7 is a timing chart of a basic image capturing and light emission operation of the first camera module 31 and the second camera module 32 illustrated in FIG. 4.

In FIG. 7, time flows from left to right.

In FIG. 7, part (A) illustrates an imaging state of the first imaging sensor 41. The first imaging sensor 41 executes imaging at intervals of a certain cycle. A narrow-angle monocular process for monitoring the driver can be performed based on an image captured by the first imaging sensor 41. The first imaging sensor 41 executes imaging during high-level periods of time. The same applies to the others.

In FIG. 7, part (B) illustrates a light projection state of the first LED 43. The first LED 43 projects light at a narrow angle to the imaging range of the first imaging sensor 41 during the imaging periods of time of the first imaging sensor 41.

In FIG. 7, part (C) illustrates an imaging state of the second imaging sensor 48. The second imaging sensor 48 executes imaging at intervals of a certain cycle. A wide-angle monocular process for monitoring the driver and the other occupants can be performed based on an image captured by the second imaging sensor 48. The wide-angle monocular process may include not only a process of monitoring the state of each of the plurality of occupants included in a captured image but also a process of transmitting the captured image for viewing with a mobile terminal or the like. The image to be viewed can include all of the occupants including the driver. In this case, as illustrated in part (C) of FIG. 7, the image captured by the second imaging sensor 48 may be used alternately for the monitoring process and the transmission process. Even in this case, since the state of the driver is monitored by the first imaging sensor 41 capturing an image of the driver at shorter intervals of time, it can be expected that the automobile 1 moves without difficulty.

The interval at which the second imaging sensor 48 performs imaging is twice as long as the interval at which the first imaging sensor 41 performs imaging. The timing at which the second imaging sensor 48 performs imaging is synchronized with the timing at which the first imaging sensor 41 performs imaging. Synchronization of the image captured by the first imaging sensor 41 and the image captured by the second imaging sensor 48 enables parallax to be accurately computed based on the shift between the positions of the driver in the captured images. The parallax is based on the interval between the first imaging sensor 41 and the second imaging sensor 48. In addition, a binocular process using an image captured by the first imaging sensor 41 and an image captured by the second imaging sensor 48, which are synchronized with each other, can be performed.

As described above, the first imaging sensor 41 configured to capture an image of the upper body or the head of the driver at a narrow angle performs imaging at shorter intervals than the second imaging sensor 48 configured to capture an image of the entirety of the inside of the passenger compartment 3 at a wide angle, and performs imaging in synchronization with the second imaging sensor 48 at a rate of once every multiple times. When the first imaging sensor 41 and the second imaging sensor 48 perform imaging in synchronization with each other, the monitoring controller 37 can execute a monitoring process based on the image captured by the first imaging sensor 41 and the image captured by the second imaging sensor 48. When the first imaging sensor 41 and the second imaging sensor 48 perform imaging in synchronization with each other, the monitoring controller 37 can execute a process different from that when the first imaging sensor 41 performs imaging alone or when the second imaging sensor 48 performs imaging alone.

In FIG. 7, part (D) illustrates a light projection state of the second LED 46. The second LED 46 projects light at a wide angle to the imaging range of the second imaging sensor 48 during the imaging periods of time of the second imaging sensor 48.

In FIG. 7, part (E) illustrates the amount of light projected to the driver when light of the first LED 43 illustrated in part (B) of FIG. 7 and light of the second LED 46 illustrated in part (D) of FIG. 7 are projected. As illustrated in FIG. 7, when the first LED 43 and the second LED 46 output light in a similar manner, the amount of light projected to the driver changes at each imaging timing. The brightness of the driver in the captured images changes according to the amount of projected light.

FIG. 8 is a timing chart of an image capturing and light emission operation of the first camera module 31 and the second camera module 32 illustrated in FIG. 4 according to this embodiment.

Parts (A) to (E) of FIG. 8 basically correspond to parts (A) to (E) of FIG. 7, respectively.

Note that, as illustrated in part (D) of FIG. 8, the amount of light projected from the second LED 46 is lower than the amount of light projected from the first LED 43 illustrated in part (B) of FIG. 8. The second LED 46 outputs a smaller amount of light than the first LED 43.

When the second LED 46 projects light in synchronization with the first LED 43, the amount of light projected from the first LED 43 is lower than that in the normal operation in which the second LED 46 does not project light in synchronization with the first LED 43. When the second LED 46 projects light in synchronization with the first LED 43, the amount of light output from the first LED 43 is reduced by an amount substantially corresponding to the amount of light output from the second LED 46.

Thus, as illustrated in part (E) of FIG. 8, the amount of light projected to the driver when the first LED 43 and the second LED 46 project light in synchronization with each other is substantially the same as the amount of light projected to the driver when the first LED 43 projects light alone. The brightness of the driver in the captured images can be constant. The brightness correction for the captured images in accordance with light projection is no longer necessary.

In this embodiment, as described above, even if the first LED 43 and the second LED 46 project light in synchronization with each other to capture images with the first imaging sensor 41 and the second imaging sensor 48 in synchronization with each other, for example, the amount of light projected to the driver is less likely to change between when light is projected in a synchronized manner and when light is projected from the first LED 43 alone. The monitoring controller 37 configured to monitor the occupants can continuously acquire an image with stable brightness as an image captured by the first imaging sensor 41.

Figure 9:
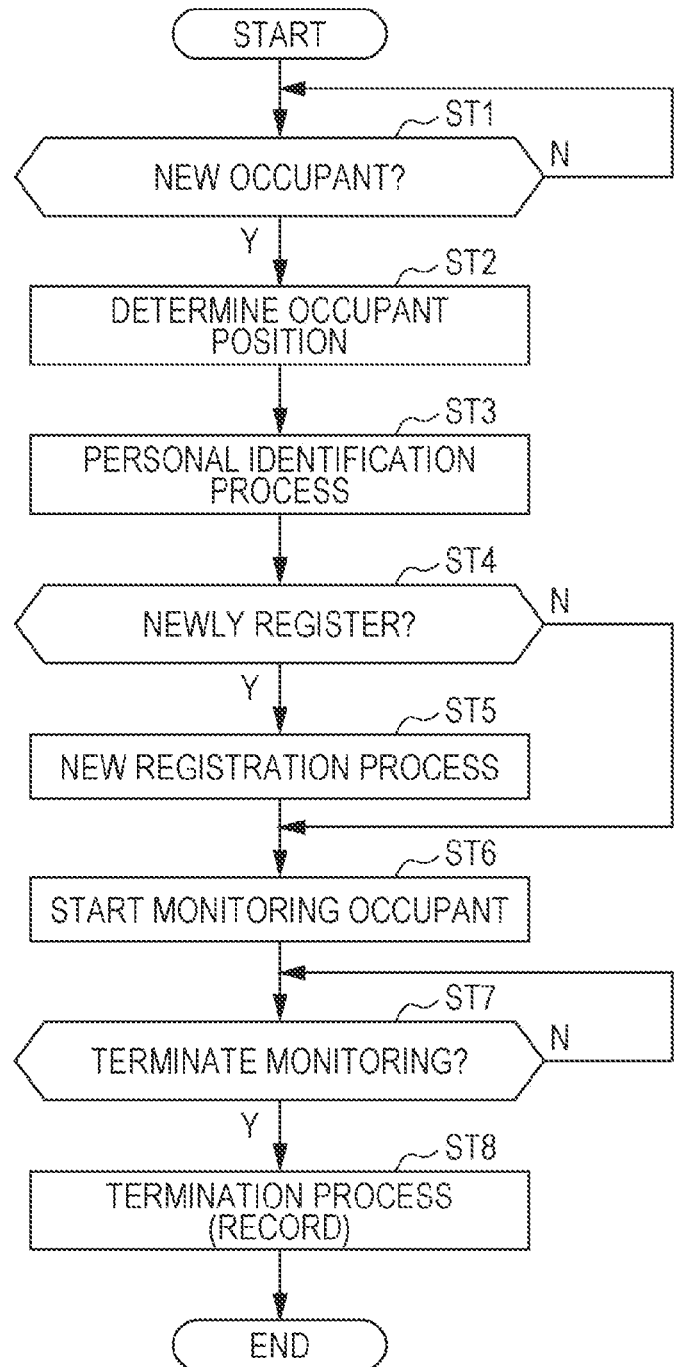
FIG. 9 is a flowchart of main control performed by a monitoring controller illustrated in FIG. 4.

FIG. 9 is a flowchart of main control performed by the monitoring controller 37 illustrated in FIG. 4.

When a new occupant rides in the automobile 1, the monitoring controller 37 repeatedly executes the process illustrated in FIG. 9.

In step ST1, the monitoring controller 37 determines whether a new occupant rides in the automobile 1. The occupant opens a door (not illustrated) of the automobile 1 and sits on the seat 4. The monitoring controller 37 may detect a new occupant riding in the automobile 1 based on, for example, an opening/closing detection signal of the door opening/closing sensor 11. Alternatively, for example, the monitoring controller 37 may determine whether a new occupant has ridden in the automobile 1, based on whether imaging data of the first imaging sensor 41 or the second imaging sensor 48 includes a captured image of the new occupant. If no new occupant has ridden in the automobile 1, the monitoring controller 37 repeatedly performs this process. If a new occupant has ridden in the automobile 1, the monitoring controller 37 advances the process to step ST2.

In step ST2, the monitoring controller 37 determines the position of the new occupant. The monitoring controller 37 may determine the position of the new occupant, based on imaging data of the second imaging sensor 48 configured to capture an image of the entirety of the inside of the automobile 1. In response to detection of an occupant being seated in a stable position on the seat 4, the monitoring controller 37 may determine that the occupant is at this position.

In step ST3, the monitoring controller 37 executes a personal identification process on the new occupant. The monitoring controller 37 may execute a personal identification process on the new occupant, based on the latest imaging data of the second imaging sensor 48 configured to capture an image of the entirety of the inside of the automobile 1.

For example, the monitoring controller 37 may compare the image of the occupant included in the image of the imaging data with the occupant data of the plurality of occupants recorded in the memory 36 and accurately identify each occupant. At this time, the monitoring controller 37 may perform the comparison based on an image component captured from the front within the registered imaging data of each occupant registered in the memory 36. Rather than comparing the images directly, the monitoring controller 37 may compare feature points extracted from the respective images. If the occupant data registered in the memory includes registered imaging data that matches the imaging data with a certain degree of certainty or more, the monitoring controller 37 may specify the occupant who has ridden in the automobile 1 to be an occupant represented by the registered imaging data. In this case, the monitoring controller 37 identifies the occupant who has ridden in the automobile 1 as an occupant specified by matching against the plurality of pieces of occupant data registered in the memory 36. If the plurality of pieces of occupant data registered in the memory 36 do not include registered imaging data that matches the imaging data with a certain degree of certainty or more, the monitoring controller 37 may identify the occupant as an unregistered occupant.

If there is an occupant whose occupant data has been recorded in the memory 36, the monitoring controller 37 may further execute a setting process using the occupant data. In this case, the monitoring controller 37 outputs information of the settings data to the components of the automobile 1. Accordingly, processes such as the position of the occupant seated on the seat, initial setting of whether driving assistance is enabled, traveling preference information for automatic driving, information on a server device to be used, occupant protection setting, and air conditioning setting are executed. For example, the monitoring controller 37 may determine whether a child bucket seat is present on the front passenger seat 4, based on the acquired latest imaging data, and, if a child bucket seat is present on the front passenger seat 4, the monitoring controller 37 may execute setting for prohibiting the air bag from being deployed toward the front passenger seat 4.

In step ST4, the monitoring controller 37 determines whether to newly register the new occupant. For example, in response to an occupant operation being performed on the display operation panel 34 when a confirmation screen for a registration process is being displayed on the liquid crystal device 33, the monitoring controller 37 determines that new registration is to be performed, and advances the process to step ST5. In response to an operation for not performing registration, the monitoring controller 37 advances the process to step ST6.

In step ST5, the monitoring controller 37 executes a process of newly registering the new occupant. The monitoring controller 37 additionally records occupant data of the new occupant in the memory 36.

In step ST6, the monitoring controller 37 starts monitoring control for the new occupant.

In step ST7, the monitoring controller 37 determines whether to terminate the monitoring control for the occupant. For example, when the automobile 1 has come to a stop and the ignition is turned off, when the automobile 1 has reached the destination and is brought to a stop, or when the occupants have exited the automobile 1, the monitoring controller 37 may determine to terminate the monitoring control for the occupant. The monitoring controller 37 may determine whether the occupants have exited the automobile 1, based on opening/closing detection of the door opening/closing sensor 11 or based on the image from the first imaging sensor 41 or the second imaging sensor 48, for example. If the monitoring control for the occupant is not to be terminated, the monitoring controller 37 repeatedly performs this process. If the monitoring control for the occupant is to be terminated, the monitoring controller 37 advances the process to step ST8.

In step ST8, the monitoring controller 37 executes a process for terminating the monitoring of the occupant. For example, the monitoring controller 37 acquires settings information of each occupant for exiting the automobile 1 from the components of the automobile 1 and updates the occupant data of each occupant recorded in the memory 36. Accordingly, the occupant data registered in the memory 36 is adapted to the preference of the occupant. Next time each occupant rides in the automobile 1, the latest settings for the occupant are automatically set. Alternatively, the monitoring controller 37 may temporarily record occupant data of an unregistered occupant in the memory 36. Accordingly, when this occupant performs a registration operation thereafter, the settings can be immediately associated with the occupant.

Then, the monitoring controller 37 ends the monitoring control illustrated in FIG. 9.

Figure 10:
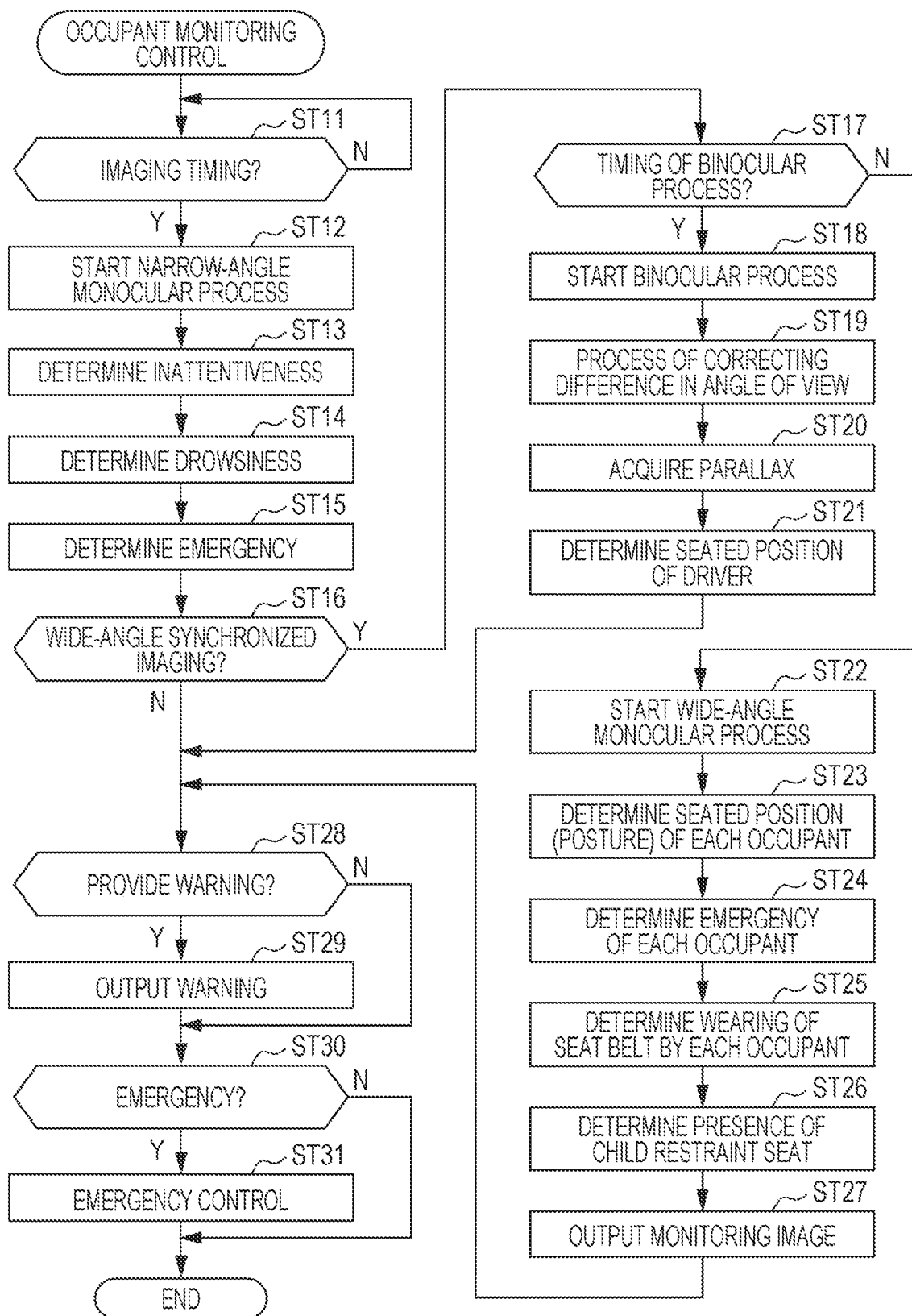
FIG. 10 is a flowchart of monitoring control for a plurality of occupants, which is performed by the monitoring controller illustrated in FIG. 4.

FIG. 10 is a flowchart of monitoring control for a plurality of occupants, which is performed by the monitoring controller 37 illustrated in FIG. 4.

If it is determined in step ST6 in FIG. 9 that monitoring control for the first occupant is to be started, the monitoring controller 37 repeatedly executes the monitoring control illustrated in FIG. 10 until it is determined in step ST7 that the monitoring control is to be terminated after the last occupant has exited the automobile 1.

In step ST11, the monitoring controller 37 determines whether a processing timing based on imaging has been reached. The first imaging sensor 41 configured to capture an image of the upper body or the head of the driver at a narrow angle and the second imaging sensor 48 configured to capture an image of the entirety of the inside of the passenger compartment 3 at a wide angle execute imaging at the respective imaging timings illustrated in FIG. 8 and output imaging data to the monitoring controller 37. If new imaging data is acquired from the first imaging sensor 41 or the second imaging sensor 48, the monitoring controller 37 determines that the processing timing based on imaging has been reached, and then advances the process to step ST12. If no new imaging data is acquired, the monitoring controller 37 repeatedly performs this process and waits until the processing timing based on imaging is reached.

In step ST12, the monitoring controller 37 starts a narrow-angle monocular process based basically on an image captured by the first imaging sensor 41 configured to capture an image of the upper body or the head of the driver.

In step ST13, the monitoring controller 37 determines inattentiveness of the driver, based on the image captured by the first imaging sensor 41. For example, the monitoring controller 37 extracts the image component of the eyes of the driver from the image captured by the first imaging sensor 41. The monitoring controller 37 determines whether the line of sight estimated from the image component of the eyes of the driver is directed in the traveling direction of the automobile 1. If the line of sight of the driver is in the traveling direction of the automobile 1, the monitoring controller 37 determines that the driver is not inattentive. If a state in which the line of sight of the driver is not in the traveling direction of the automobile continuously occurs a plurality of times, the monitoring controller 37 determines that the driver is inattentive.

In step ST14, the monitoring controller 37 determines drowsiness of the driver, based on the image captured by the first imaging sensor 41. For example, the monitoring controller 37 extracts the image component of the eyes of the driver from the image captured by the first imaging sensor 41. If it is estimated from the image component of the eyes of the driver that the eyes are open, the monitoring controller 37 determines that the driver is not drowsy. If the eyes of the driver are continuously closed a plurality of times, the monitoring controller 37 determines that the driver is drowsy or dozing.

In step ST15, the monitoring controller 37 determines emergency of the driver, based on the image captured by the first imaging sensor 41. For example, the monitoring controller 37 extracts the image component of the seated posture of the driver from the image captured by the first imaging sensor 41. If the seated posture of the driver is not suitable for driving such that, for example, the driver is seated with their head down, the monitoring controller 37 determines that the driver has an emergency. Alternatively, for example, the monitoring controller 37 may obtain, from the image captured by the first imaging sensor 41, information such as the pulse and blood flow of the driver. In this case, if the pulse of the driver is greater than a threshold value or the amount of increase or decrease in blood flow is greater than or equal to a threshold value, the monitoring controller 37 determines that the driver has an emergency.

Accordingly, the monitoring controller 37 terminates the narrow-angle monocular process.

In step ST16, the monitoring controller 37 determines whether the current processing timing is the timing of wide-angle synchronized imaging. As illustrated in FIG. 8, the second imaging sensor 48 configured to capture an image of the entirety of the inside of the passenger compartment 3 at a wide angle may capture an image simultaneously with the first imaging sensor 41 and output imaging data to the monitoring controller 37. At the timing of the synchronized imaging, the monitoring controller 37 determines that the current processing timing is the timing of wide-angle synchronized imaging, and then advances the process to step ST17. If new imaging data is acquired from the first imaging sensor 41 alone at the current processing timing, the monitoring controller 37 does not execute other determination processing and advances the process to step ST28 for subsequent processing.

In step ST17, the monitoring controller 37 determines whether the timing of a binocular process for synchronized imaging has been reached. As illustrated in FIG. 8, when the second imaging sensor 48 performs imaging in synchronization with the first imaging sensor 41, the monitoring controller 37 alternately executes a binocular process using both an image captured by the first imaging sensor 41 and an image captured by the second imaging sensor 48 and a wide-angle monocular process to be performed basically on an image captured by the second imaging sensor 48. In the first synchronized imaging after the monitoring control illustrated in FIG. 10 has started, if the wide-angle monocular process has been previously executed, the monitoring controller 37 determines that the timing of the binocular process has been reached, and then advances the process to step ST18. If the binocular process has been previously executed, the monitoring controller 37 determines that the timing of the wide-angle monocular process, rather than the timing of the binocular process, has been reached, and then advances the process to step ST22. Information related to the content of the previous process may be recorded in the memory 36. After the process determination is made in step ST17, the monitoring controller 37 may update the information on the previous process recorded in the memory 36.

In step ST18, the monitoring controller 37 starts a binocular process using both an image captured by the first imaging sensor 41 and an image captured by the second imaging sensor 48. The monitoring controller 37 may specify, in the image captured by the first imaging sensor 41 and the image captured by the second imaging sensor 48, the positions of the driver included in both the image captured by the first imaging sensor 41 and the image captured by the second imaging sensor 48.

In step ST19, the monitoring controller 37 executes a process of correcting the difference in angle of view between the image captured by the first imaging sensor 41 and the image captured by the second imaging sensor 48. For example, the monitoring controller 37 computes the difference in angle of view corresponding to the interval between the first imaging sensor 41 and the second imaging sensor 48, based on the position of the driver included in the image captured by the first imaging sensor 41 and the position of the driver included in the image captured by the second imaging sensor 48. The monitoring controller 37 may correct, based on the difference in angle of view acquired by the computation, pixel-by-pixel driver-position information to be used for the narrow-angle monocular process for the image captured by the first imaging sensor 41 and pixel-by-pixel driver-position information to be used for the wide-angle monocular process for the image captured by the second imaging sensor 48. The monitoring controller 37 may record the acquired information on the difference in angle of view and the pixel-by-pixel driver-position information in the memory 36.

In step ST20, the monitoring controller 37 acquires parallax between the first imaging sensor 41 and the second imaging sensor 48. The monitoring controller 37 may compute the parallax between the first imaging sensor 41 and the second imaging sensor 48, based on the location of the first imaging sensor 41, the location of the second imaging sensor 48, the sensor interval, the difference in angle of view, and the like.

In step ST21, the monitoring controller 37 determines the seated position of the driver. The monitoring controller 37 computes, based on the image captured by the first imaging sensor 41 and the image captured by the second imaging sensor 48, the direction of or the distance to a body part of the driver, such as the head, the neck, or the waist, and specifies the position of the body part in the seat 4. The monitoring controller 37 may determine whether the specified position of the body part of the driver is a correct seat position.

Thus, the monitoring controller 37 terminates the binocular process. Then, the monitoring controller 37 advances the process to step ST28 for subsequent processing.

In step ST22, the monitoring controller 37 starts a wide-angle monocular process to be performed basically on an image captured by the second imaging sensor 48.

In step ST23, the monitoring controller 37 determines the seated position (or seated posture) of each of the plurality of occupants including the driver, based on the image captured by the second imaging sensor 48. The monitoring controller 37 extracts, for example, the image component of each occupant from the image captured by the second imaging sensor 48. The monitoring controller 37 determines whether the seated position (or seated posture) indicated by the image component of each occupant is suitable as a seated position (or seated posture) during movement of the automobile 1. For example, if the seated position (or seated posture) of the occupant is recumbent, the monitoring controller 37 determines that the seated position (or seated posture) of the occupant is not suitable as a seated position (or seated posture) during movement of the automobile 1.

In step ST24, the monitoring controller 37 determines emergency of each of the plurality of occupants including the driver, based on the image captured by the second imaging sensor 48. The monitoring controller 37 extracts, for example, the image component of each occupant from the image captured by the second imaging sensor 48. The monitoring controller 37 determines whether the image component of each occupant corresponds to an emergency. For example, if the seated position (or seated posture) of the occupant is recumbent, the monitoring controller 37 determines that the seated position (or seated posture) of the occupant corresponds to an emergency.

In step ST25, the monitoring controller 37 determines wearing of the seat belt by each of the plurality of occupants including the driver, based on the image captured by the second imaging sensor 48. The monitoring controller 37 extracts, for each of the plurality of occupants including the driver, the image component of the seat belt. If the image component of the seat belt indicates that the seat belt is not fastened across the upper body of each occupant, the monitoring controller 37 determines that the seat belt is not correctly worn.

In step ST26, the monitoring controller 37 determines the presence of a child restraint seat, based on the image captured by the second imaging sensor 48. The monitoring controller 37 attempts to extract the image component of a child restraint seat. If the image component of a child restraint seat can be extracted, the monitoring controller 37 determines that a child restraint seat is present.

In step ST27, the monitoring controller 37 generates, based on the image captured by the second imaging sensor 48, a monitoring image for viewing with a mobile terminal or the like and outputs the monitoring image.

Accordingly, the monitoring controller 37 terminates the wide-angle monocular process. Then, the monitoring controller 37 advances the process to step ST28 for subsequent processing.

In step ST28, the monitoring controller 37 starts the subsequent processing based on the determination of the plurality of monitoring types described above. First, the monitoring controller 37 determines whether the determined plurality of monitoring types described above include a monitoring type in which a warning is to be performed. If a monitoring type in which a warning is to be performed is included, the monitoring controller 37 advances the process to step ST29. Otherwise, the monitoring controller 37 advances the process to step ST30.

In step ST29, the monitoring controller 37 outputs a warning corresponding to the content of the monitoring type in which a warning is to be performed.

The warning to be provided to the driver may be, for example, a warning displayed on the liquid crystal device 33 or a warning sound output from the speaker device 14. When the automobile 1 is continuously traveling over a predetermined period of time or longer, when the driver blinks their eyes with a predetermined frequency, or when the head of the driver tends to drop down, the monitoring controller 37 may determine that control is to be performed, and provide an output to prompt the driver to take a rest, for example.

In step ST30, the monitoring controller 37 determines whether the determined plurality of monitoring types described above include a monitoring type in which emergency control is to be performed. If a monitoring type in which emergency control is to be performed is included, the monitoring controller 37 advances the process to step ST31. Otherwise, the monitoring controller 37 ends the control illustrated in FIG. 10.

In step ST31, the monitoring controller 37 executes emergency control in accordance with the content of the monitoring type in which emergency processing is to be performed. If the driver does not look forward even after a warning is output, that is, if it is determined that the driver keeps their line of sight away from the forward roadway, the monitoring controller 37 may switch the driving mode of the automobile 1 to automatic driving and decelerate and stop the automobile 1. When decelerating the automobile 1 and bringing the automobile 1 to a stop, the monitoring controller 37 may turn on a hazard light (not illustrated) and transmit emergency information through the external communication device 18. For example, if it is determined that the driver is drowsy or has a high pulse, the monitoring controller 37 may decelerate and stop the automobile 1. When decelerating the automobile 1 and bringing the automobile 1 to a stop, the monitoring controller 37 may turn on a hazard light (not illustrated) and transmit emergency information through the external communication device 18.

Then, the monitoring controller 37 ends the control illustrated in FIG. 10.

As described above, the monitoring controller 37 executes a plurality of types of processes for monitoring, namely, a narrow-angle monocular process based on an image captured by the first imaging sensor 41, a wide-angle monocular process based on an image of the passenger compartment 3 captured by the second imaging sensor 48 at a different angle of view or in a different imaging range from that of the first imaging sensor 41, and a binocular process based on the image captured by the first imaging sensor 41 and the image captured by the second imaging sensor 48.

The monitoring controller 37 executes different types of processes between when the first imaging sensor 41 and the second imaging sensor 48 perform imaging in synchronization with each other and when either of the first imaging sensor 41 and the second imaging sensor 48 performs imaging.

As a plurality of types of monitoring processes based on an image captured by the first imaging sensor 41 in the narrow-angle monocular process, the monitoring controller 37 determines inattentiveness of the driver, determines drowsiness of the driver, and determines emergency of the driver. In the narrow-angle monocular process, the monitoring controller 37 may execute other processes or some of the processes.

As a plurality of types of monitoring processes in the binocular process based on an image captured by the first imaging sensor 41 configured to capture an image of the upper body or the head of the driver and an image captured by the second imaging sensor 48 configured to capture an image of the entirety of the inside of the passenger compartment 3, the monitoring controller 37 executes a correction process for reducing a difference in angle of view or a difference in imaging range between the first imaging sensor 41 and the second imaging sensor 48 in response to the first imaging sensor 41 and the second imaging sensor 48 performing imaging in synchronization with each other, acquires parallax information between the first imaging sensor 41 and the second imaging sensor 48, and determines the seated position of the driver. As a monitoring process based on a correlation between the image captured by the first imaging sensor 41 and the image captured by the second imaging sensor 48, the monitoring controller 37 determines the seated position of an occupant, based on a difference between the position of the occupant in the image captured by the first imaging sensor 41 and the position of the occupant in the image captured by the second imaging sensor 48. In the binocular process, the monitoring controller 37 may execute other processes or some of the processes.

As a plurality of types of monitoring processes based on an image captured by the second imaging sensor 48 in the wide-angle monocular process, the monitoring controller 37 determines the seated position or posture of each occupant, determines emergency of each occupant, determines wearing of a seat belt by each occupant, determines the presence of a child restraint seat, and outputs the image captured by the second imaging sensor 48. In the wide-angle monocular process, the monitoring controller 37 may execute other processes or some of the processes.

As described above, in this embodiment, the first imaging sensor 41 and the second imaging sensor 48, which are configured to capture an image of occupants in the passenger compartment 3 of the automobile 1, capture images of the passenger compartment 3 at different angles of view or in different imaging ranges. Accordingly, the monitoring controller 37 can execute a plurality of types of processes for the occupants in the passenger compartment 3, based on the image captured by the first imaging sensor 41 and the image captured by the second imaging sensor 48.

In contrast, for example, if the first imaging sensor 41 and the second imaging sensor 48, which are configured to capture an image of occupants in the passenger compartment 3 of the automobile 1, capture images at the same angle of view or in the same imaging range, the monitoring controller 37 obtains similar images as the image captured by the first imaging sensor 41 and the image captured by the second imaging sensor 48. As a result, the monitoring controller 37 executes a process that can be performed on the images. An occupant monitoring device of the related art performs single-function processing. In this embodiment, a plurality of imaging sensors, namely, the first imaging sensor 41 and the second imaging sensor 48, perform imaging at different angles of view or in different imaging ranges to make full use of the plurality of imaging sensors. Thus, unlike the occupant monitoring device of the related art, the occupant monitoring device 15 is less likely to execute limited processes that are restricted by images of the imaging sensors. In this embodiment, to achieve multifunctionality in terms of monitoring processes and the like for occupants including the driver, the number of imaging sensors is not increased in proportion to the increase in the number of functions. In this embodiment, a small number of imaging sensors can be used to achieve multifunctionality in terms of monitoring processes and the like for occupants including the driver.

The embodiment described above is illustrative. The disclosure is not limited to this embodiment and may be modified or changed in various ways without departing from the scope of the disclosure.

For example, in the embodiment described above, two imaging sensors, namely, the first imaging sensor 41 and the second imaging sensor 48, are disposed. Three or more imaging sensors may be disposed. The same applies to LEDs serving as light-emitting members. A number of LEDs different from the number of imaging sensors may be disposed.

The monitoring controller 37 illustrated in FIG. 4 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the monitoring controller 37. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 4.

The invention claimed is:

1. An in-vehicle multi-monitoring device for a vehicle, the in-vehicle multi-monitoring device comprising:
   a first imaging member configured to perform first imaging to capture first images of one or more occupants in a passenger compartment of the vehicle;
   a second imaging member configured to perform second imaging to capture second images of the one or more occupants in the passenger compartment of the vehicle, wherein the first imaging member and the second imaging member are configured to perform the first imaging and the second imaging respectively at different angles of view or in different imaging ranges; and
   a controller configured to:
      cause the first imaging member to perform the first imaging at first intervals to capture the first images;
      cause the second imaging member to perform the second imaging at second intervals to capture the second images, the second intervals being longer than the first intervals, the second intervals being set such that one of the second images is captured simultaneously with one of the first images for every multiple images of the first images captured;
      receive the first images from the first imaging member;
      receive the second images from the second imaging member;
      execute a first process based on a first image of the captured first images and a second image of the captured second images; and
      execute a second process based on either one of (i) one or more of the first images or (ii) one or more of the second images, the second process being different from the first process.

2. The in-vehicle multi-monitoring device according to claim 1, wherein
   the first process includes using the first image of the first images and the second image of the second images to acquire parallax information between the first imaging member and the second imaging member or determine a seated position of a driver of the vehicle,
   the second process includes:
      determining, based only on the one or more of the first images, a state of a driver who drives the vehicle among the one or more occupants, the state of the driver including inattentiveness of the driver, drowsiness of the driver, or emergency of the driver; and
      determining, based only on the one or more of the second images, a state of each of the one or more occupants, the state of each of the one or more occupants including a seated position or posture of each of the one or more occupants, emergency of the each of the one or more occupants, wearing of a corresponding seat belt by the each of the one or more occupants, or a presence of a child restraint seat.

3. The in-vehicle multi-monitoring device for the vehicle according to claim 2, wherein
   the first imaging member is configured to perform the first imaging such that the first image includes an upper body or a head of the driver, and
   the second imaging member is configured to perform the second imaging with a wider angle than the first imaging such that the second image includes the driver and an occupant in the vehicle other than the driver.

4. The in-vehicle multi-monitoring device for the vehicle according to claim 2, wherein
   the controller is configured to:
      acquire correction information by executing a correction process for reducing a difference in angle of view or a difference in imaging range between the first imaging member and the second imaging member in response to the first imaging and the second imaging;
      execute, based on the correction information, acquiring the parallax information between the first imaging member and the second imaging member or determining the seated position of the driver.

5. The in-vehicle multi-monitoring device for the vehicle according to claim 2, wherein
   the first process includes:
      determining the inattentiveness of the driver;
      determining the drowsiness of the driver; or
      determining the emergency of the driver.

6. The in-vehicle multi-monitoring device according to claim 2, wherein
   the second process includes:
      determining the seated position or posture of the each of the one or more occupants;
      determining the emergency of each of the one or more occupants;
      determining the wearing of a seat belt by each of the one or more occupants;
      determining the presence of the child restraint seat; or
      outputting the second image.

7. The in-vehicle multi-monitoring device according to claim 2, wherein
the plurality of types of processes includes:
the second process is a monocular process based on either one of the first images or the second images; and
the first process is a binocular process based on the first image and the second image.

8. The in-vehicle multi-monitoring device for the vehicle according to claim 1, wherein
the first imaging member is configured to perform the first imaging such that the first image includes an upper body or a head of a driver who drives the vehicle, and
the second imaging member is configured to perform the second imaging with a wider angle than the first imaging such that the second image includes the driver and an occupant in the vehicle other than the driver.

9. The in-vehicle multi-monitoring device for the vehicle according to claim 8, wherein
the controller is configured to:
acquire correction information by executing a correction process for reducing a difference in angle of view or a difference in imaging range between the first imaging member and the second imaging member in response to simultaneously capturing the first image using the first imaging and capturing the second image using the second imaging; and
execute, based on the correction information, acquiring parallax information between the first imaging member and the second imaging member or determining a seated position of the driver.

10. The in-vehicle multi-monitoring device for the vehicle according to claim 8, wherein
the first process includes:
determining inattentiveness of the driver;
determining drowsiness of the driver; or
determining emergency of the driver.

11. The in-vehicle multi-monitoring device according to claim 8, wherein
the second process includes:
determining a seated position or posture of the each of the one or more occupants;
determining emergency of each of the one or more occupants;
determining wearing of a seat belt by each of the one or more occupants;
determining a presence of a child restraint seat; or
outputting the second image.

12. The in-vehicle multi-monitoring device according to claim 8, wherein
the second process is a monocular process based on either one of the first images or the second images; and
the first process is a binocular process based on the first image and the second image.

13. The in-vehicle multi-monitoring device according to claim 1, wherein
the controller is configured to:
acquire correction information by executing a correction process for reducing a difference in angle of view or a difference in imaging range between the first imaging member and the second imaging member in response to simultaneously capturing the first image using the first imaging and capturing the second image using the second imaging; and
execute, based on the correction information, acquiring parallax information between the first imaging member and the second imaging member or determining a seated position of a driver of the vehicle.

14. The in-vehicle multi-monitoring device according to claim 1, wherein
the first process includes:
determining inattentiveness of a driver who drives the vehicle;
determining drowsiness of the driver; or
determining emergency of the driver.

15. The in-vehicle multi-monitoring device according to claim 1, wherein
the second process includes:
determining a seated position or posture of each of the one or more occupants;
determining emergency of each of the one or more occupants;
determining wearing of a seat belt by each of the one or more occupants;
determining a presence of a child restraint seat; or
outputting the second image.

16. The in-vehicle multi-monitoring device according to claim 1, wherein
the second process is a monocular process based on either one of the first images or the second images; and
the first process is a binocular process based on the first image and the second image.

17. The in-vehicle multi-monitoring device according to claim 1, wherein the first imaging member and the second imaging member are disposed such that a distance from the first imaging member to a driver who drives the vehicle is greater than a distance from the second imaging member to the driver.

18. The in-vehicle multi-monitoring device according to claim 1, wherein the first process includes acquiring parallax information between the first imaging member and the second imaging member, and the second process includes determining a state of a driver who drives the vehicle.

19. The in-vehicle multi-monitoring device according to claim 1, wherein a cycle of causing the first imaging member to perform the first imaging with first intervals is as multiple times shorter than a cycle of causing the second imaging member to perform the second imaging with second intervals.

20. An in-vehicle multi-monitoring device for a vehicle, the in-vehicle multi-monitoring device comprising:
a camera module configured to perform first imaging to capture first images of one or more occupants in a passenger compartment of the vehicle;
a second camera module configured to perform second imaging to capture second images of the one or more occupants in the passenger compartment of the vehicle; and circuitry configured to:
cause the first imaging member to perform the first imaging at first intervals to capture the first images, and receive information of the first images including a first image from the first imaging member, and cause the second imaging member to perform the second imaging at second intervals that are longer than the first intervals and that are intervals to capture a second image simultaneously at a rate of once every multiple times with capturing the first image of the first imaging member to capture the second images, and receive information of the second images including the second image from the second imaging member;

execute a process on the first image and the second image captured at different angles of view or in different imaging ranges among the first images and the second images;

execute a first process based on the first image and the second image captured at the different angles of view or in the different imaging ranges among the first images and the second images; and execute a second process based on either one of (i) one or more of the first images or (ii) one or more of the second images among the first images and the second images, the second process being different from the first process.

* * * * *